United States Patent
Lee et al.

(10) Patent No.: US 10,473,940 B2
(45) Date of Patent: Nov. 12, 2019

(54) DISPLAY DEVICE HAVING A DISPLAY MODULE AND AN EYEPIECE LENS

(71) Applicant: LG Display Co., Ltd., Seoul (KR)

(72) Inventors: Keong-Jin Lee, Seoul (KR); Hyeon-Ho Son, Goyang-si (KR); Sung-Min Jung, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/955,473

(22) Filed: Apr. 17, 2018

(65) Prior Publication Data

US 2018/0299676 A1      Oct. 18, 2018

(30) Foreign Application Priority Data

Apr. 18, 2017  (KR) .................. 10-2017-0050043

(51) Int. Cl.
| | |
|---|---|
| *G02B 27/01* | (2006.01) |
| *G02F 1/1335* | (2006.01) |
| *H01L 27/32* | (2006.01) |
| *G02B 27/28* | (2006.01) |
| *G02B 25/00* | (2006.01) |
| *G02F 1/13363* | (2006.01) |
| *H01L 51/52* | (2006.01) |

(52) U.S. Cl.
CPC ......... *G02B 27/0172* (2013.01); *G02B 27/28* (2013.01); *G02F 1/133555* (2013.01); *H01L 27/32* (2013.01); *G02B 25/001* (2013.01); *G02B 2027/0123* (2013.01); *G02B 2027/0178* (2013.01); *G02F 1/133536* (2013.01); *G02F 1/133603* (2013.01); *G02F 1/133615* (2013.01); *G02F 2001/133543* (2013.01); *G02F 2001/133557* (2013.01); *G02F 2001/133638* (2013.01); *H01L 51/5262* (2013.01)

(58) Field of Classification Search
CPC .... G02B 20/10; G02B 2027/01; G02B 27/28; G02B 27/0172; G02B 2027/0123; G02B 25/001; G02B 2027/0178; H01L 27/32; H01L 51/5262; G02F 1/133555; G02F 2001/133543; G02F 2001/133557
See application file for complete search history.

(56) References Cited

U.S. PATENT DOCUMENTS

| | | | |
|---|---|---|---|
| 9,555,589 B1 * | 1/2017 | Ambur | ............ B29D 11/00644 |
| 2002/0057498 A1 * | 5/2002 | Kobayashi | ......... G02B 27/0172 |
| | | | 359/630 |

* cited by examiner

*Primary Examiner* — Sultan Chowdhury
*Assistant Examiner* — Danell L Owens
(74) *Attorney, Agent, or Firm* — Seed IP Law Group LLP (57) ABSTRACT

A display device including a display module and an eyepiece lens is provided. A user can view an image realized by the display module through the eyepiece lens. In the display play according to the present disclosure, a path of a light moving from the display module to the eyepiece lens may be increased by a half-mirror and a reflective polarizing plate which are located between the display module and the eyepiece lens. Thus, in the display device according to the present disclosure, the overall thickness may be decreased without degrading the quality of the image realized by the display module.

20 Claims, 7 Drawing Sheets

DISPLAY DEVICE HAVING A DISPLAY MODULE AND AN EYEPIECE LENS

CROSS-REFERENCE TO RELATED APPLICATION(S)

This application claims the priority benefit of Korean Patent Application No. 10-2017-0050043, filed Apr. 18, 2017, which is hereby incorporated by reference as if fully set forth herein.

BACKGROUND

Technical Field

The present disclosure relates to a display device in which a user can view an image realized by a display module through an eyepiece lens.

Description of the Related Art

Generally, a display device includes a display module for realizing an image. For example, the display module may include a liquid crystal panel having a liquid crystal, and an OLED panel having an organic light-emitting element.

The display device may further include an eyepiece lens to provide a user with an image realized by the display module, and a mounting element to align the eyepiece lens with the user. The display module is accommodated in a body including a surface coupled to the eyepiece lens. The mounting element may extend outwardly from the surface of the body. For example, the display device may be a head mounted display device (HMD).

A thickness of the display device may be proportional to a distance between the display module and the eyepiece lens. If the eyepiece lens is located too close to the display module, the image realized by the display module may be enlarged to the user. Thus, in the display device, when a distance between the eyepiece lens and the display module is less than a predetermined value, the user may recognize a non-display area in which a black matrix is located, so that the quality of the image realized by the display module may be degraded. Therefore, in the display device, the reduction of the overall thickness may be restricted.

BRIEF SUMMARY

Accordingly, the present disclosure is directed to a display device that substantially obviates one or more problems due to limitations and disadvantages of the related art.

An object of the present disclosure is to provide a display device in which the overall thickness may be reduced without degrading the quality of the realized image.

Another object of the present disclosure is to provide a display device capable of increasing a path of a light moving from a display module to an eyepiece lens.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, there is provided a display device including an eyepiece lens on a display module. A half-mirror is disposed between the eyepiece lens and the display module. A reflective polarizing plate is disposed between the half-mirror and the eyepiece lens. The reflective polarizing plate includes a cholesteric liquid crystal (CLC).

The display module, the half-mirror and the reflective polarizing plate may be accommodated in a body. The body may include a first surface coupled to the eyepiece lens. A mounting element may be located on the first surface of the body. The mounting element may extend outwardly from the first surface of the body.

A rear quarter-wave plate may be disposed between the reflective polarizing plate and the eyepiece lens.

A rear linear polarizing plate may be disposed between the rear quarter-wave plate and the eyepiece lens.

The display module may include a display panel, a panel polarizer and a module quarter-wave plate. The panel polarizer may be located between the display panel and the module quarter-wave plate. The half-mirror may be disposed on the module quarter-wave plate.

The display panel may include a lower substrate, a lower light-emitting electrode, a light-emitting layer, an upper light-emitting electrode and an upper substrate, which are sequentially stacked.

The panel polarizer may be in direct contact with the upper substrate of the display panel and the module quarter-wave plate.

The half-mirror may be located close to the display module.

The half-mirror may be a meniscus shape protruding toward the display module.

The eyepiece lens may be a flat shape.

In another embodiment, a display device includes a half-mirror on a surface of a display module. A reflective polarizing plate is disposed on the half-mirror. An eyepiece lens is disposed on the reflective polarizing plate. A light circularly polarized in a first direction is reflected by the reflective polarizing plate. A light circularly polarized in a second direction opposite to the first direction transmits through the reflective polarizing plate.

A distance between the half-mirror and the reflective polarizing plate may be larger than a distance between the reflective polarizing plate and the eyepiece lens.

A front quarter-wave plate may be located between the display module and the half-mirror.

The display module may include a display panel and a panel polarizer. The panel polarizer may be located between the display panel and the front quarter-wave plate. The panel polarizer may be in direct contact with the display panel.

The display module may further include a back-light unit. The display panel may be disposed between the back-light unit and the panel polarizer.

BRIEF DESCRIPTION OF THE SEVERAL VIEWS OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Hereinafter, details related to the above objects, technical configurations, and operational effects of the embodiments of the present disclosure will be clearly understood by the following detailed description with reference to the drawings, which illustrate some embodiments of the present disclosure. Here, the embodiments of the present disclosure are provided in order to allow the technical sprit of the present disclosure to be satisfactorily transferred to those skilled in the art, and thus the present disclosure may be embodied in other forms and is not limited to the embodiments described below.

In addition, the same or extremely similar elements may be designated by the same reference numerals throughout the specification, and in the drawings, the lengths and thickness of layers and regions may be exaggerated for convenience. It will be understood that, when a first element is referred to as being "on" a second element, although the first element may be disposed on the second element so as to come into contact with the second element, a third element may be interposed between the first element and the second element.

Here, terms such as, for example, "first" and "second" may be used to distinguish any one element with another element. However, the first element and the second element may be arbitrary named according to the convenience of those skilled in the art without departing the technical sprit of the present disclosure.

The terms used in the specification of the present disclosure are merely used in order to describe particular embodiments, and are not intended to limit the scope of the present disclosure. For example, an element described in the singular form is intended to include a plurality of elements unless the context clearly indicates otherwise. In addition, in the specification of the present disclosure, it will be further understood that the terms "comprises" and "includes" specify the presence of stated features, integers, steps, operations, elements, components, and/or combinations thereof, but do not preclude the presence or addition of one or more other features, integers, steps, operations, elements, components, and/or combinations.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Embodiment

Figure 1A:
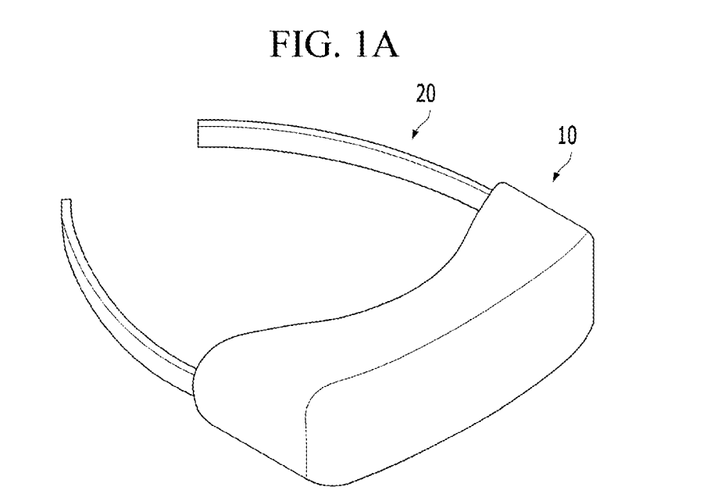
FIGS. 1A and 1B are views schematically showing a display device according to an embodiment of the present disclosure.
Figure 1B:
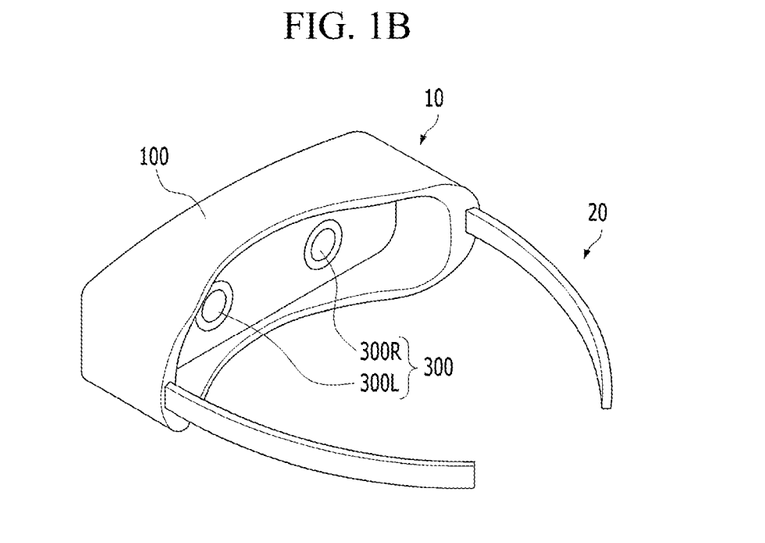
Figure 2A:
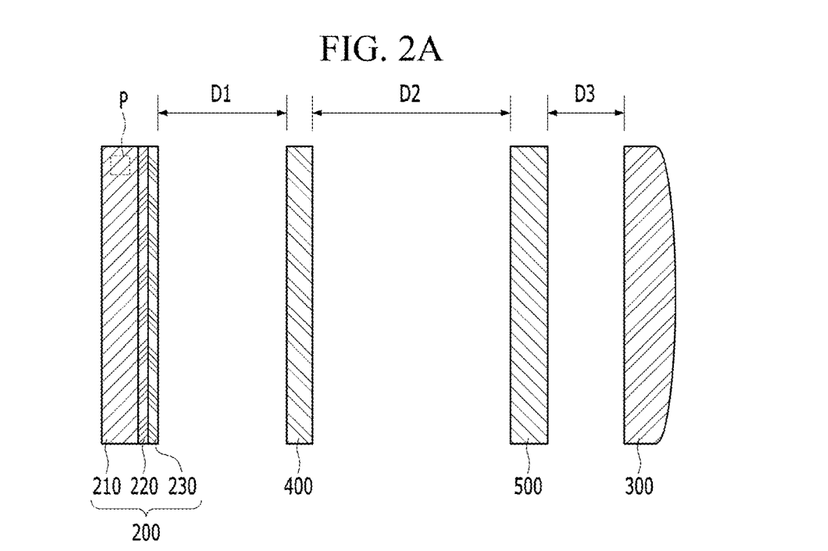
FIG. 2A is a view schematically showing an image element of a display device according to the embodiment of the present disclosure.
Figure 2B:
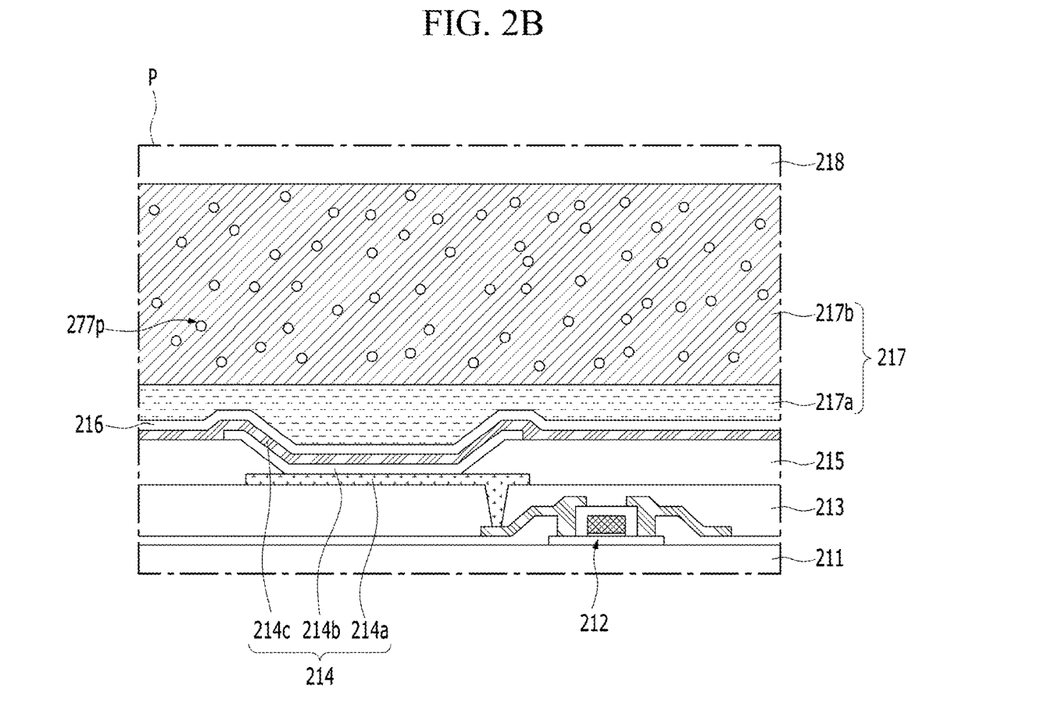
FIG. 2B is a cross-sectional view illustrating region P in FIG. 2A.

FIGS. 1A and 1B are views schematically showing a display device according to an embodiment of the present disclosure. FIG. 2A is a view schematically showing an image element of the display device according to the embodiment of the present disclosure. FIG. 2B is a cross-sectional view illustrating region P in FIG. 2A.

Referring to FIGS. 1A, 1B, 2A and 2B, the display device according to the embodiment of the present disclosure may include an image element 10 and a mounting element 20 to align the image element 10 with a user.

The image element 10 may realize an image provided to the user. For example, the image element 10 may realize an image for a virtual reality (VR) or an augmented reality (AR). The image element 10 may be fixed in front of the user's eyes by the mounting element 20. For example, the display device according to the embodiment of the present disclosure may be a head mounted display device (HMD) which is mounted on the user's head.

The display device according to the embodiment of the present disclosure is described that the mounting element 20 is a leg shape of the spectacle frame. However, the display device according to another embodiment of the present disclosure may include a mounting element 20 having various shape. For example, the display device according to another embodiment of the present disclosure may be a head-gear shape surrounding the user's head.

The image element 10 may include a body 100, a display module 200, an eyepiece lens 300, a half-mirror 400 and a reflective polarizing plate 500.

The body 100 may provide a space for realizing an image. For example, the display module 200, the half-mirror 300 and the reflective polarizing plate 500 may be accommodated in the body 100.

The display module 200 may realize an image to be provided to the user. For example, the display module 200 may include a display panel 210. The display panel 210 may include a lower substrate 211, a light-emitting element 214 and an upper substrate 218, which are sequentially stacked. The light-emitting element 214 may include a lower light-emitting electrode 214a, a light-emitting layer 214b and an upper light-emitting electrode 214c, which are sequentially stacked. The light-emitting layer 214b may include an organic light-emitting material or an inorganic light-emitting material. For example, the display panel 210 may be an OLED panel.

The display panel 210 may further include a thin film transistor 212 between the lower substrate 211 and the light-emitting element 214, an interlayer insulating layer 213 covering the thin film transistor 212, and a bank insulating layer 215 covering an edge of the lower light-emitting electrode 214a. The light-emitting element 214 may be electrically connected to the thin film transistor 212. For example, the interlayer insulating layer 213 may include a contact hole for connecting the lower light-emitting electrode 214a to the thin film transistor 212.

The display panel 210 may further include an upper passivation layer 216 and an adhesive layer 217 which are located between the light-emitting element 214 and the upper substrate 218. The adhesive layer 217 may include a lower adhesive layer 217a and an upper adhesive layer 217b. The adhesive layer 217 may prevent a damage of the light-emitting element 214 due to external moisture. For example, the upper adhesive layer 217b may include the moisture absorbing material 277b for trapping the moisture permeated from the outside.

The display module 200 may further include a panel polarizer 220 and a module quarter-wave plate 230 which are located on the upper substrate 218 of the display panel 210. The panel polarizer 220 may polarize a light emitted from the display panel 210 in a predetermined direction. The module quarter-wave plate 230 may delay the phase of a transmitted light by λ/4. The panel polarizer 220 may be disposed between the display panel 210 and the module quarter-wave plate 230. For example, the panel polarizer 220 may be in direct contact with the upper substrate 218 of the display panel 210 and the module quarter-wave plate 230. Thus, in the display device according to the embodiment of the present disclosure, the display module 200 may emit a circularly polarized light.

The display device according to the embodiment of the present disclosure is described that the light emitted from the display panel 210 is circularly polarized by the module quarter-wave plate 230. However, the display device according to another embodiment of the present disclosure may include the display modules 200 of various structures emitting the circularly polarized light.

The light emitting from the display module 200 may move towards the user through the eyepiece lens 300. The user may view the image realized by the display module 200 via the eyepiece lens 300. The eyepiece lens 300 may be aligned with the user by the mounting element 20. For example, the eyepiece lens 300 may include a left eye lens 300L aligned with the user's left eye, and a right eye lens 300R aligned with the user's right eye.

The eyepiece lens 300 may be coupled to a first surface of the body 100. The display module 200 may be located close to a second surface of the body 100 opposite to the first surface of the body 100. For example, the eyepiece lens 300 may be located on the module quarter-wave plate 230 of the display module 200. The mounting element 20 may extend outwardly from the surface of the body 100 coupled to the eyepiece lens 300. For example, the mounting element 20 may include an end portion coupled to an edge of the surface of the body 100 coupled to the eyepiece lens 300.

The half-mirror 400 may be disposed between the display module 200 and the eyepiece lens 300. The half-mirror 400 may partially reflect the incident light. For example, half of the light incident on the half-mirror 400 may pass through the half-mirror 400. The half-mirror 400 may include a semi-transparent material. For example, the half-mirror 400 may include a metal, such as magnesium, silver and aluminum.

The reflective polarizing plate 500 may be disposed between the half-mirror 400 and the eyepiece lens 300. The reflective polarizing plate 500 may reflect the light circularly polarized in a first direction. For example, the reflective polarizing plate 500 may reflect a left circularly polarized light. The light circularly polarized in a second direction opposite to the first direction may transmit through the reflective polarizing plate 500. For example, a right circularly polarized light may pass through the reflective polarizing plate 500. The reflective polarizing plate 500 may include a material that reflects the circularly polarized light in a predetermined direction. For example, the reflective polarizing plate 500 may include a cholesteric liquid crystal (CLC). The polarization direction of the light reflected by the reflective polarizing plate 500 may be determined by the helical structure of the cholesteric liquid crystal. In particular, the structure of the CLC is selected to provide a desired polarization and properties for passing light in a selected or predetermined direction. In addition, the variation of the director axis, which tends to be periodic in nature can be selected to provide a desired modification of the light. The period of this variation, the distance over which a full rotation of 360° is completed, known as the pitch, p, can also be selected if desired. This pitch determines the wavelength of light which is reflected. Thus, if a CLC is used the various properties are selected to pass the light as described herein.

FIGS. 3A to 3E are views sequentially showing a path and a state of a light moving from the display module to the eyepiece lens.

Figure 3A:
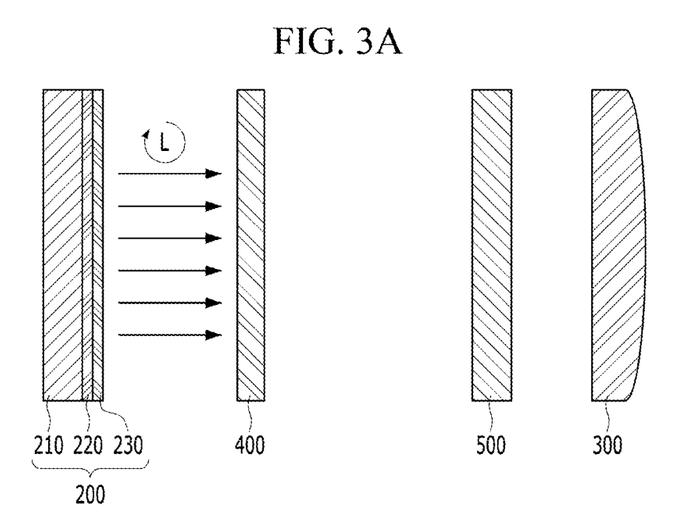
FIGS. 3A to 3E are views sequentially showing a path and a state of a light moving from the display module to the eyepiece lens.

The movement path of the light emitted from the display module 200 of the display device according to the embodiment of the present disclosure will be described with reference to FIGS. 3A to 3E. First, as shown in FIG. 3A, the display module 200 of the display device according to the embodiment of the present disclosure may emit the light toward the half-mirror 400.

The light emitted from the display module 200 may be generated by the display panel 210. The light emitted from the display module 200 may transmit through the panel polarizer 220 and the module quarter-wave plate 230. For example, in the display device according to the embodiment of the present disclosure, the light emitting from the display module 200 toward the half-mirror 400 may be the left circularly polarized light.

Figure 3B:
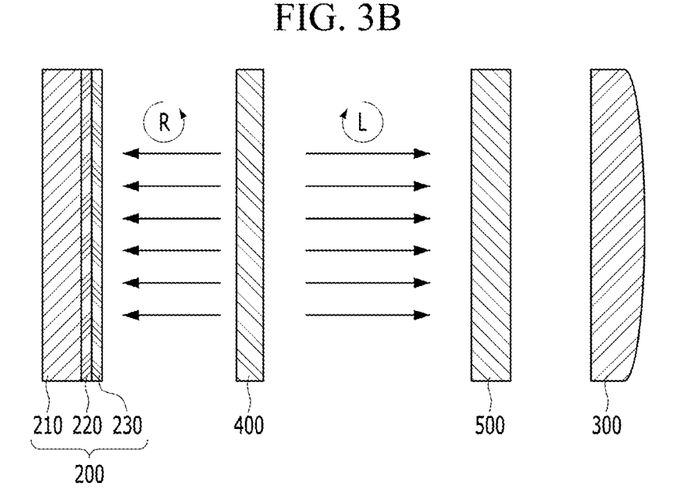

As shown in FIG. 3B, the light emitted from the display module 200 of the display device according to the embodiment of the present disclosure may partially transmit through the half-mirror 400.

The phase of the light passing through the half-mirror 400 may be not changed. For example, the light moving toward the reflective polarizing plate 500 after passing through the half-mirror 400 may be the left circularly polarized light. The light emitted from the display module 200 may be partially reflected by the half-mirror 400. The light reflected by the half-mirror 400 may be phase-reversed by the half-mirror 400. For example, the light reflected by the half-mirror 400 may be the right circularly polarized light.

Figure 3C:
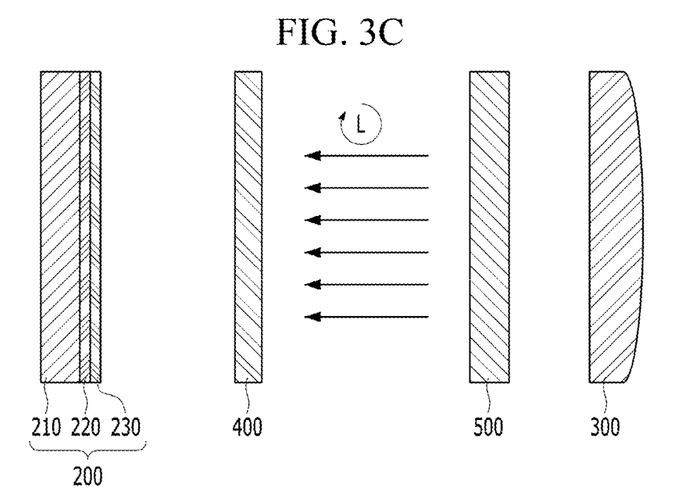

As shown in FIG. 3C, the light passing through the half-mirror 400 of the display device according to the embodiment of the present disclosure may be reflected by the reflective polarizing plate 500.

The reflective polarizing plate 500 may include a material which reflects the light emitted from the display module 200 and passing through the half-mirror 400. For example, the reflective polarizing plate 500 may include the cholesteric liquid crystal having the helical structure that reflects the left circularly polarized light. The phase of the light reflected by the reflective polarizing plate 500 may be same as the phase of the light incident on the reflective polarizing plate 500. For example, the light reflected toward the half-mirror 400 by the reflective polarizing plate 500 may be the left circularly polarized light.

Figure 3D:
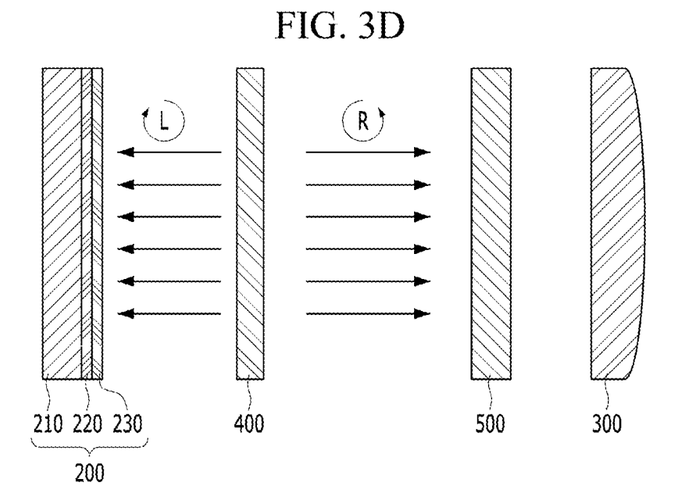

As shown in FIG. 3D, the light reflected by the reflective polarizing plate 500 of the display device according to the embodiment of the present disclosure may be partially reflected by the half-mirror 400.

The light reflected by the reflective polarizing plate 500 may partially transmit through the half-mirror 400, and move toward the display module 200. For example, the light passing through the half-mirror 400 and moving toward the display module 200 may be the left circularly polarized light. The light reflected toward the reflective polarizing plate 500 by the half-mirror 400 may be phase-reversed. For example, the light reflected toward the reflective polarizing plate 500 by the half-mirror 400 may be the right circularly polarized light.

Figure 3E:
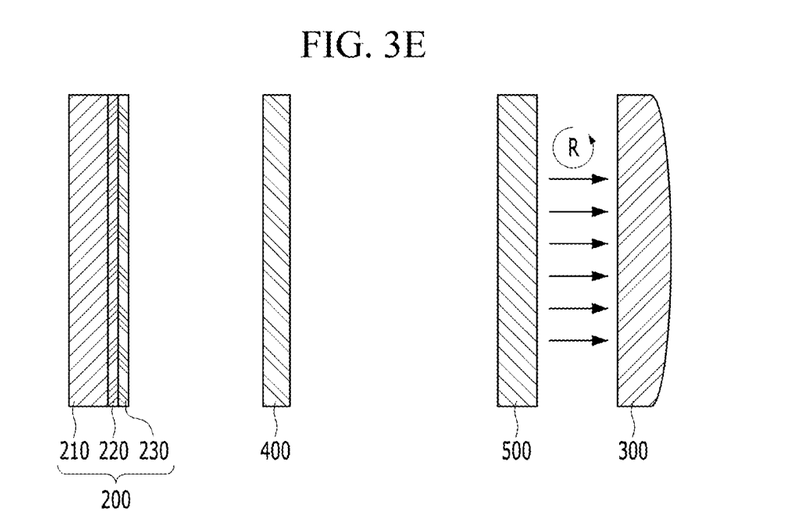

As shown in FIG. 3E, the light reflected toward the reflective polarizing plate 500 by the half-mirror 400 of the display device according to the embodiment of the present disclosure may transmit through the reflective polarizing plate 500.

Since the reflective polarizing plate 500 reflects the circularly polarized light in the first direction, the circularly polarized light in the second direction opposite to the first direction may pass through the reflective polarizing plate 500. Since the light reflected by the half-mirror 400 is phase-reversed by the half-mirror 400, the light reflected toward the reflective polarizing plate 500 by the half-mirror 400 may pass through the reflective polarizing plate 500. For example, the right circularly polarized light reflected toward the reflective polarizing plate 500 by the half-mirror 400 may move toward the eyepiece lens 300 after passing through the reflective polarizing plate 500.

Accordingly, in the display device according to the embodiment of the present disclosure, the light moving toward the eyepiece lens 300 from the display module 200 may be repeated once between the half-mirror 400 and the reflective polarizing plate 500 which are located between the display module 200 and the eyepiece lens 300. Thus, in the display device according to the embodiment of the present disclosure, the path of the light moving toward the eyepiece lens 300 from the display module 200 may be increased by twice the distance between the half-mirror 400 and the reflective polarizing plate 500. When the path of the light moving toward the eyepiece lens 300 from the display module 200 is increased, the focal distance of the eyepiece lens 300 may be decreased. That is, when the path of the light moving toward the eyepiece lens 300 from the display module 200 is increased, the display module 200 may be located close to the eyepiece lens 300 for providing the user with a normal sized image. Therefore, in the display device according to the embodiment of the present disclosure, the distance between the display module 200 and the eyepiece lens 300 may be decreased without degrading the quality of the image provided to the user.

In the display device according to the embodiment of the present disclosure, the path of the light moving toward the eyepiece lens 300 from the display module 200 may be proportional to a distance between the half-mirror 400 and the reflective polarizing plate 500. Thus, in the display device according to the embodiment of the present disclosure, a distance between the half-mirror 400 and the reflective polarizing plate 500 can be maximized, so that the movement path of the light may be efficiently increased. For example, in the display device according to the embodiment of the present disclosure, the half-mirror 400 may be located close to the display module 200, as shown in FIG. 2A. a first distance D1 between the display module 200 and the half-mirror 400 may be smaller than a second distance D2 between the half-mirror 400 and the reflective polarizing plate 500. The reflective polarizing plate 500 may be disposed close to the eyepiece lens 300. The second distance D2 between the half-mirror 400 and the reflective polarizing plate 500 may be larger than a third distance D3 between the reflective polarizing plate 500 and the eyepiece lens 300. Therefore, in the display device according to the embodiment of the present disclosure, the overall thickness may be efficiently decreased. However, the present disclosure is not limited thereto, and if appropriate, the first to third distances D1 to D3 may have various relationships other than those described above.

Figure 4:
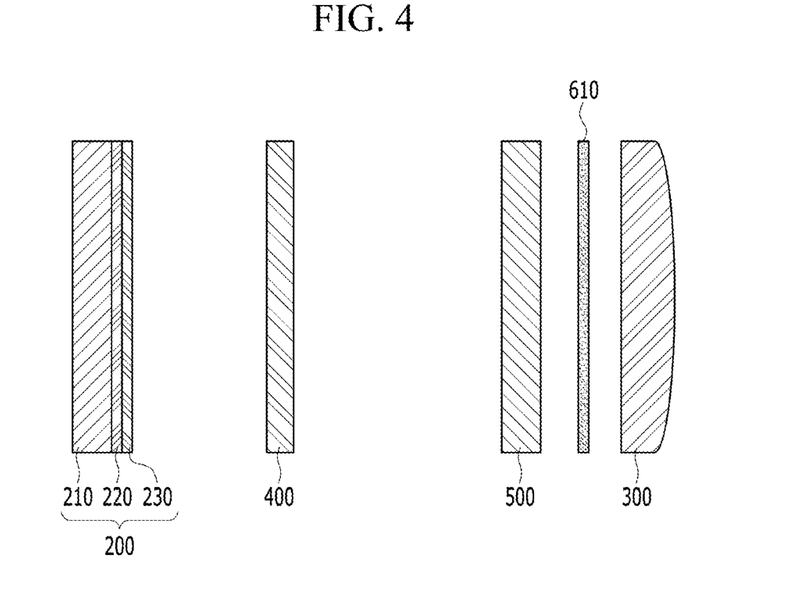
FIGS. 4 to 7 are views respectively showing a display device according to another embodiment of the present disclosure.

The display device according to the embodiment of the present disclosure is described that the circularly polarized light passing through the reflective polarizing plate 500 enters the eyepiece lens 300. However, as shown in FIG. 4, the display device according to another embodiment of the present disclosure may further include a rear quarter-wave plate 610 between the reflective polarizing plate 500 and the eyepiece lens 300. Thus, in display device according to another embodiment of the present disclosure, the light provided to the user may be the linearly polarized light.

Figure 5:
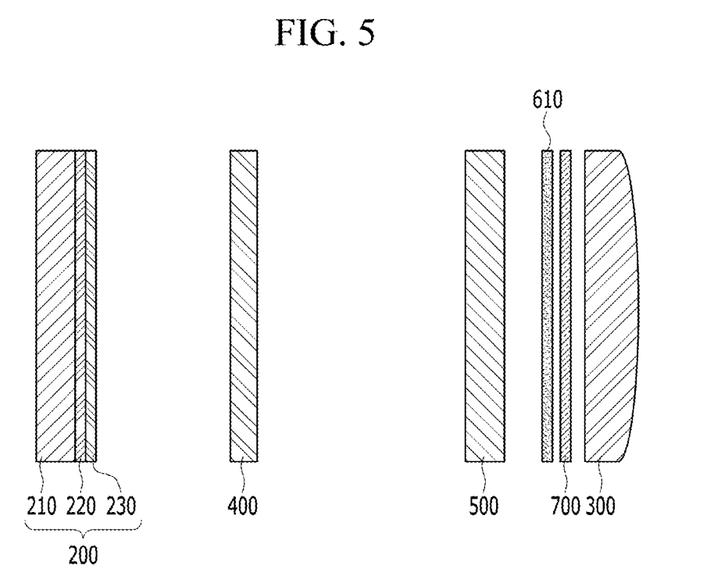

Also, as shown in FIG. 5, the display device according to another embodiment of the present disclosure may further include a rear quarter-wave plate 610 and a rear liner polarizing plate 700 which are located between the reflective polarizing plate 500 and the eyepiece lens 300. The rear quarter-wave plate 610 and the rear linear polarizing plate 700 may prevent the external light moving toward the reflective polarizing plate 500 after passing though the eyepiece lens 300 from being reflected and emitted again. Thus, in the display device according to another embodiment of the present disclosure, the overall thickness may be reduced and the visibility may be improved.

The display device according to another embodiment of the present disclosure is described that the rear linear polarizing plate 700 is disposed between the rear quarter-wave plate 610 and the eyepiece lens 300. However, the display device according to further another embodiment of the present disclosure may include the rear quarter-wave plate 610 between the rear linear polarizing plate 700 and the eyepiece lens 300.

Figure 6:
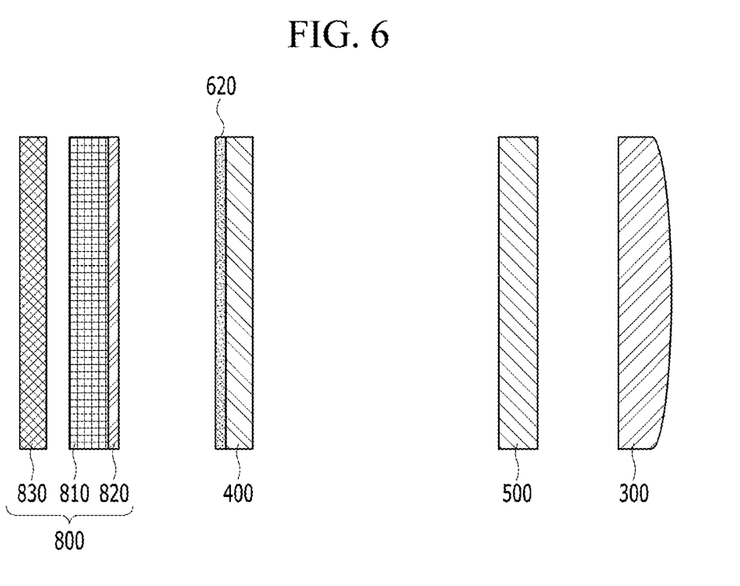

The display device according to the embodiment of the present disclosure is described that the light emitted from the display module 200 may be the circularly polarized light. However, the display device according to another embodiment of the present disclosure may include the display module 200 emitting a linearly polarized light. For example, as shown in FIG. 6, the display device according to another embodiment of the present disclosure may include a display module 800 having a display panel 810 and a panel polarizer 820 between the display panel 810 and the half-mirror 400. The display panel 810 may include a liquid crystal panel having a liquid crystal. For example, in the display device according to another embodiment of the present disclosure, the display module 800 may further include a back-light unit 830. The back-light unit 830 may be located on a rear surface of the display panel 810. The back-light unit 830 may uniformly irradiate the display panel 810. The back-light unit 830 may be an edge type. For example, the back-light unit 830 may include a light guide plate, at least one light source on a side of the light guide plate, and an optical sheet on the light guide plate. The back-light unit 830 may be a direct type. For example, the back-light unit 830 may include optical sheets having a diffusion plate, and light sources disposed in parallel with the diffusion plate. The display panel 810 may be disposed between the back-light unit 830 and the panel polarizer 820. The display device according to another embodiment of the present disclosure may further include a front quarter-wave plate 620 between the display module 800 and the half-mirror 400. Thus, in the display device according to another embodiment of the present disclosure, the circularly polarized light may be incident on the half-mirror 400 from the display module 800. The front quarter-wave plate 620 may be in direct contact with the half-mirror 400. Therefore, in the display device according to another embodiment of the present disclosure, the degree of freedom for the display module 800 may be improved, and the overall thickness may be reduced.

Figure 7:
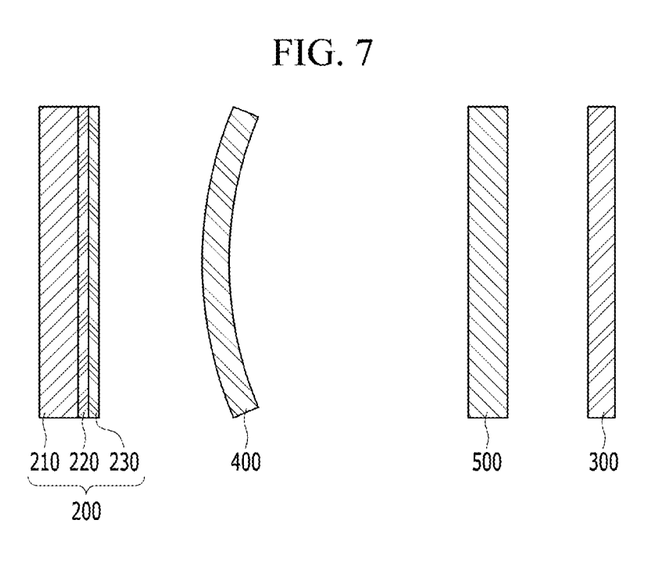

The display device according to the embodiment of the present disclosure is described that the half-mirror 400 is a flat shape. However, as shown in FIG. 7, the display device according to another embodiment of the present disclosure may include a half-mirror 400 having a meniscus shape. The half-mirror 400 may protrude toward the display module 200. The light reflected by the half-mirror 400 having the meniscus shape may be refracted. Thus, in the display device according to another embodiment of the present disclosure, the eyepiece lens 300 may be not a shape having the predetermined focal distance such as the convex lens. For example, in the display device according to another embodiment of the present disclosure, the eyepiece lens 300 may be a flat shape. Therefore, in the display device according to another embodiment of the present disclosure, the degree of freedom for selecting the half-mirror 400 and the eyepiece lens 300 may be improved.

In the result, the display device according to embodiments of the present disclosure may increase the path of the light moving toward the eyepiece lens from the display panel using the half-mirror and the reflective polarizing plate. Thus, the display device according to embodiments of the present disclosure may decrease the distance between the display panel and the eyepiece lens without degrading the quality of the image. Thereby, in the display device according to embodiments of the present disclosure, the overall thickness may be reduced.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A display device, comprising:
   a display module;
   an eyepiece lens on the display module;
   a half-mirror between the display module and the eyepiece lens;
   a reflective polarizing plate between the half-mirror and the eyepiece lens; and
   a rear quarter-wave plate between the reflective polarizing plate and the eyepiece lens,
   wherein the reflective polarizing plate includes a cholesteric liquid crystal.

2. The display device according to claim 1, further comprising:
   a body including a first surface coupled to the eyepiece lens; and
   a mounting element extending outwardly from the first surface of the body,
   wherein the display module, the half-mirror and the reflective polarizing plate are accommodated in the body.

3. The display device according to claim 2, wherein the display module is located close to a second surface opposite to the first surface of the body.

4. The display device according to claim 1, further comprising a rear liner polarizing plate between the rear quarter-wave plate and the eyepiece lens.

5. The display device according to claim 1, wherein a distance between the display module and the half-mirror is smaller than a distance between the half-mirror and the reflective polarizing plate.

6. The display device according to claim 1, wherein the half-mirror is a meniscus shape protruding toward the display module.

7. The display device according to claim 6, wherein the eyepiece lens is a flat shape.

8. The display device according to claim 1, wherein a polarization direction of a light reflected by the reflective polarizing plate is determined by a helical structure of the cholesteric liquid crystal.

9. The display device according to claim 1, wherein a light reflected by the half-mirror is phase-reversed by the half-mirror.

10. A display device, comprising:
    a display module;
    an eyepiece lens on the display module;
    a half-mirror between the display module and the eyepiece lens,
    wherein the reflective polarizing plate includes a cholesteric liquid crystal, and
    wherein the display module includes a display panel, a module quarter-wave plate between the display panel and the half-mirror and a panel polarizer between the display panel and the module quarter-wave plate.

11. The display device according to claim 10, wherein the display panel includes a lower substrate, a lower light-emitting electrode, a light-emitting layer, an upper light-emitting electrode and an upper substrate, which are sequentially stacked.

12. The display device according to claim 11, wherein the panel polarizer is in direct contact with the upper substrate and the module quarter-wave plate.

13. The display device according to claim 10 wherein a distance between the display module and the half-mirror is smaller than a distance between the half-mirror and the reflective polarizing plate.

14. The display device according to claim 10 wherein a light reflected by the half-mirror is phase-reversed by the half-mirror.

15. A display device, comprising:
    a display module;
    a half-mirror on a surface of the display module;
    a front quarter-wave plate between the display module and the half-mirror;
    a reflective polarizing plate on the half-mirror; and
    an eyepiece lens on the reflective polarizing plate,
    wherein the reflective polarizing plate reflects a light circularly polarized in a first direction, and transmits a light circularly polarized in a second direction opposite to the first direction, and
    wherein the display module includes a display panel and a panel polarizer between the display panel and the front quarter-wave plate.

16. The display device according to claim 15, wherein a distance between the half-mirror and the reflective polarizing plate is larger than a distance between the reflective polarizing plate and the eyepiece lens.

17. The display device according to claim 15,
    wherein the panel polarizer is in direct contact with the display panel.

18. The display device according to claim 17, wherein the display module further includes a back-light unit, and
    wherein the display panel is disposed between the back-light unit and the panel polarizer.

19. The display device according to claim 15, wherein a polarization direction of a light reflected by the reflective polarizing plate is determined by a helical structure of the cholesteric liquid crystal.

20. The display device according to claim 15, wherein a light reflected by the half-mirror is phase-reversed by the half-mirror.

* * * * *

UNITED STATES PATENT AND TRADEMARK OFFICE
CERTIFICATE OF CORRECTION

PATENT NO. : 10,473,940 B2
APPLICATION NO. : 15/955473
DATED : November 12, 2019
INVENTOR(S) : Keong-Jin Lee et al.

Page 1 of 1

It is certified that error appears in the above-identified patent and that said Letters Patent is hereby corrected as shown below:

In the Claims

Column 10, Claim 10, Line 20-21:
"piece lens,"
Should read:
--piece lens; and
a reflective polarizing plate between the half-mirror and the eyepiece lens,--.

Signed and Sealed this
Twenty-second Day of September, 2020

Andrei Iancu
*Director of the United States Patent and Trademark Office*